Jan. 31, 1939. I. N. BEALL ET AL 2,145,679
AUTOCLAVE AND ACCESSORY THEREFOR
Filed May 20, 1936 4 Sheets-Sheet 1
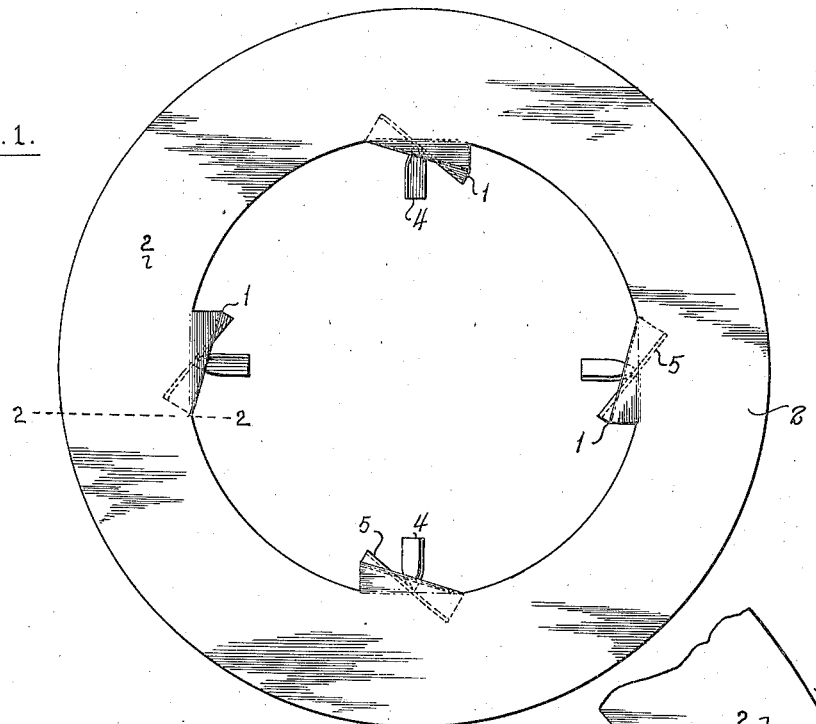
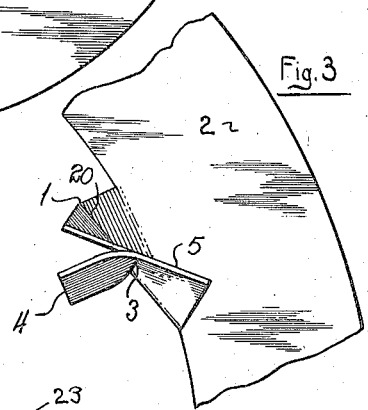
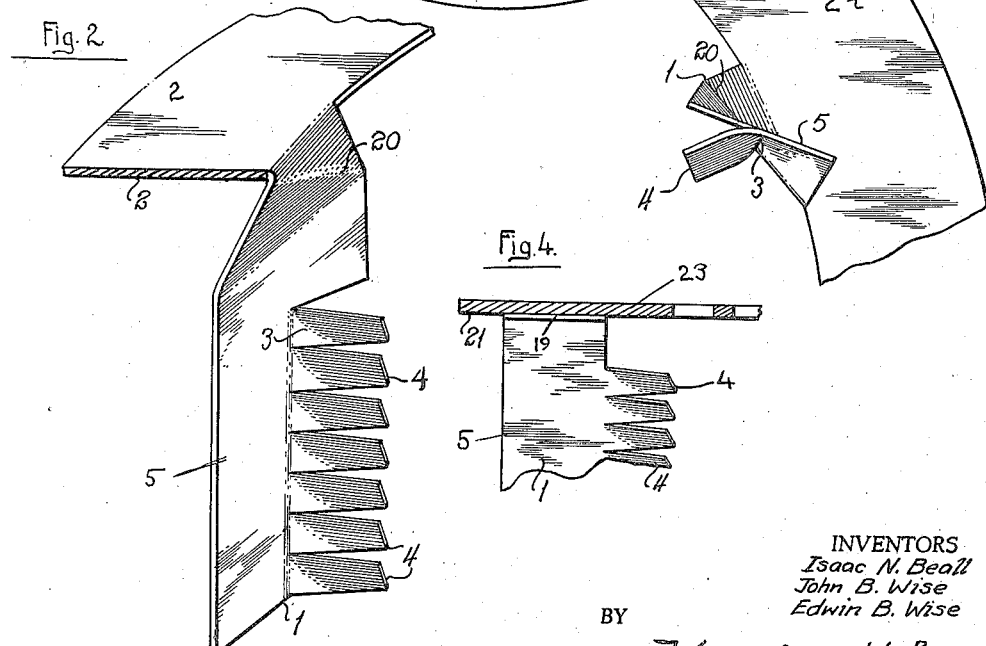
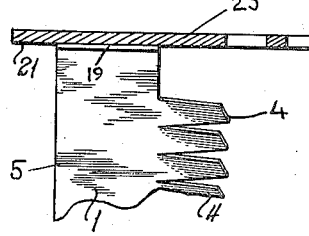
INVENTORS
Isaac N. Beall
John B. Wise
Edwin B. Wise
BY
ATTORNEY.

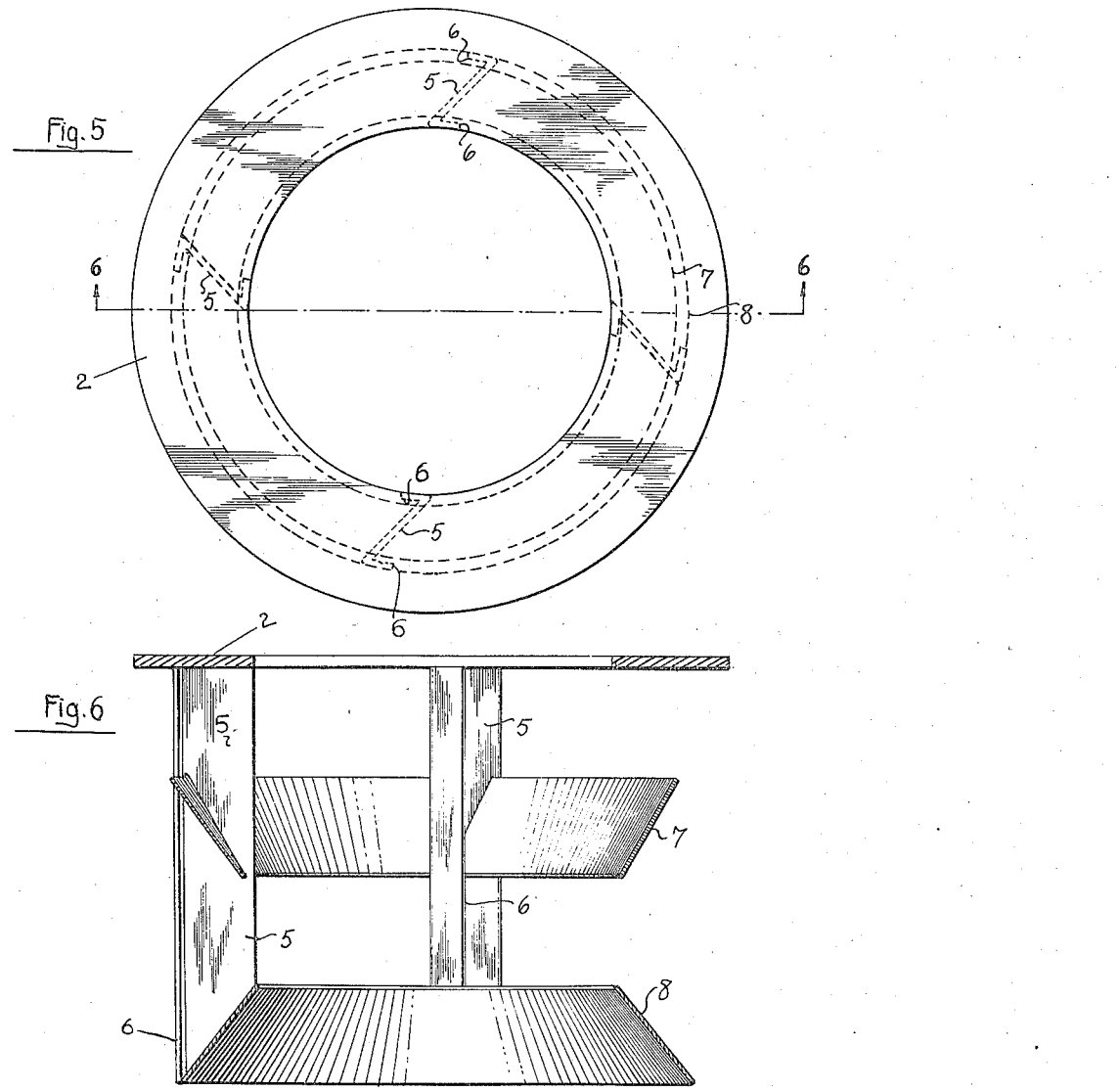

Jan. 31, 1939.  I. N. BEALL ET AL  2,145,679
AUTOCLAVE AND ACCESSORY THEREFOR
Filed May 20, 1936   4 Sheets-Sheet 3
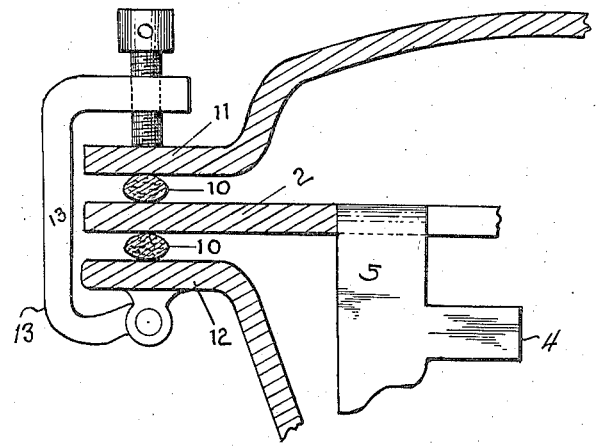
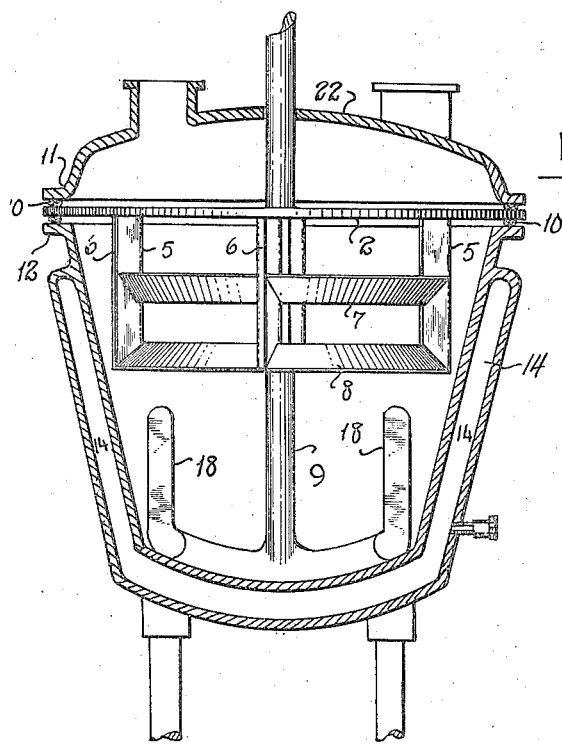
INVENTORS
Isaac N. Beall
John B. Wise
Edwin B. Wise
BY
ATTORNEY.

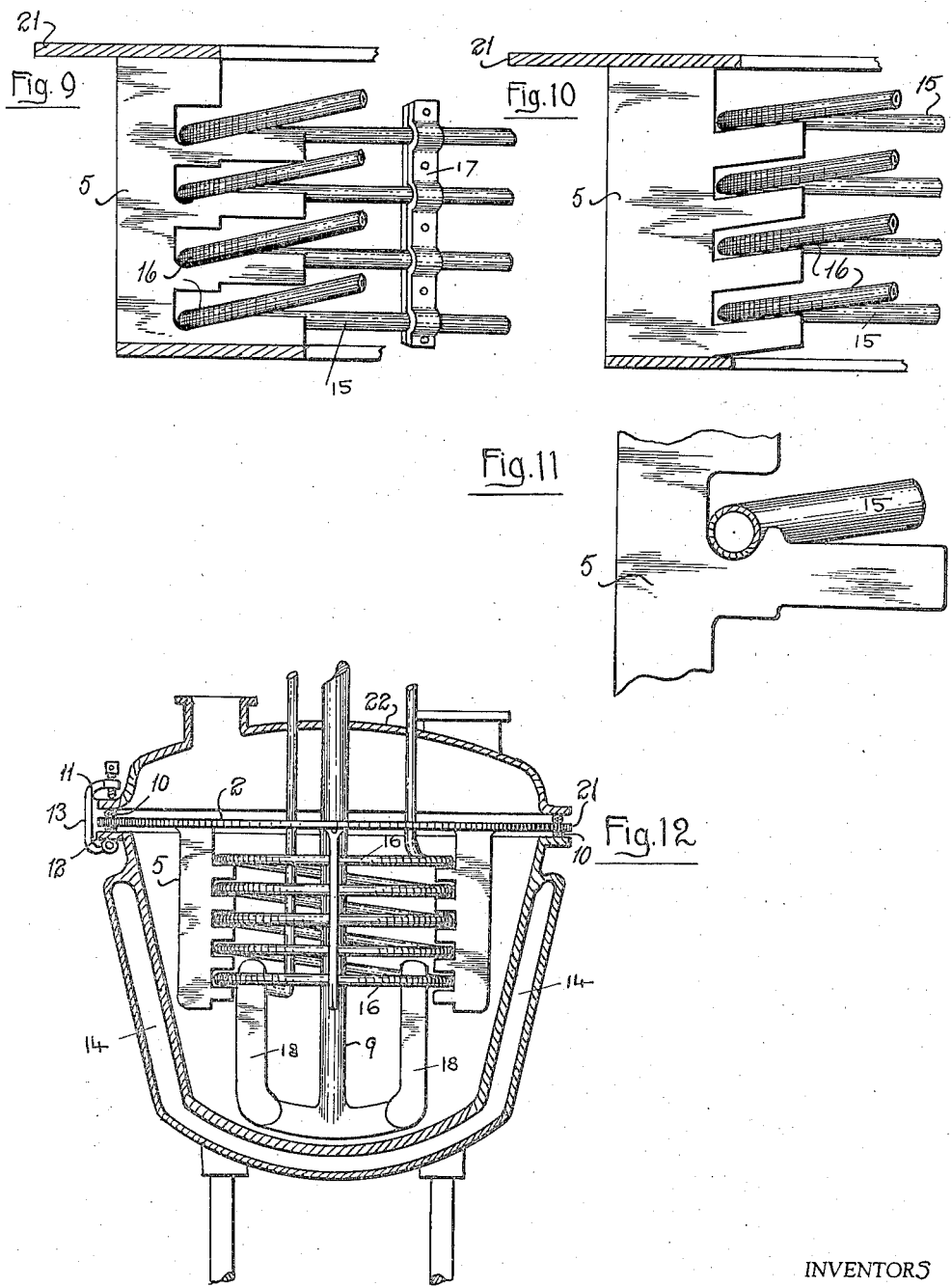

Patented Jan. 31, 1939

2,145,679

UNITED STATES PATENT OFFICE 2,145,679

AUTOCLAVE AND ACCESSORY THEREFOR

Isaac N. Beall, John B. Wise, and Edwin B. Wise, Baltimore, Md.

Application May 20, 1936, Serial No. 80,914

9 Claims. (Cl. 23—290)

Our invention relates to methods of installing accessories in autoclaves or other closed vessels and to improvements in the accessories themselves.

Autoclaves in general use have unlined metal or earthenware shells. These are not satisfactory in many kinds of reactions, since the material is not resistant to the corrosive action of acids or other chemicals. So these unlined autoclaves are short-lived and have the further disadvantage of contaminating the purity of chemical reactions by reason of the corrosive effect. These defects are overcome by enamelling the entire inner surface of the shell thus preventing contact of the contents with the metal, or earthenware. While our invention is especially designed for use with these enamel-lined autoclaves, our method of installing baffles and other accessories can be used in those that are unlined as well as in other vessels either with or without accessories of various types. Thus by our invention enameled autoclaves are adapted for all purposes and for all reactions.

The use of these enamel autoclaves has heretofore been restricted, owing to the difficulty in installing baffles and other accessories therein. The installation of these presents no difficulty in unlined autoclaves in which accessories can be permanently secured to the inner surface of the shell. This manner of installation is not feasible for autoclaves that are enamel-lined.

Enameling autoclaves so that the enameling is durable is difficult. The greatest care must be used to insure thorough fusing of the vitreous lining to the inner surface of the shell. For at best this lining is fragile and easily cracked. To enamel autoclaves properly, the inner surface must be unbroken, smooth, of uniform thickness and free from all irregularities.

No method has heretofore been discovered of effectively installing accessories in enamel-lined autoclaves so as to enable them to be enameled properly. Accessories previously had to be fastened permanently to the inner shell before the enameling was done. This renders the inner surface so uneven that it was impossible to fuse enamel thoroughly to the inner shell, after the accessory had been so installed. Moreover accessories were not interchangeable.

An attempt was made to overcome the difficulty of installing baffles in enamel-lined autoclaves, by attaching them to the manhole cover on its top. It has proved only partially successful as the baffle was limited in shape to a simple shaft and was unable to stand the strain set up by the rapid rotation of an agitator in heavy mixtures under high pressure. The whirling action of the liquid tended to set up a whip-like vibration of the baffle.

In our invention we provide means of readily installing baffles, coils and other accessories without marring or even so much as coming in contact with the inner surface of the autoclave. Thus our invention overcomes all necessity of using unlined autoclaves since it enables the accessories to be installed in enamel-lined ones of the ordinary type without injury to the vitreous lining. Moreover, by our invention baffles and other accessories can be enameled separately thus rendering enameling better, easier and cheaper.

Another advantage of our invention is that accessories can be installed in the enameled and other autoclaves now in use without having to make any alteration whatsoever. Moreover by our method of installation, accessories can be installed in enamel-lined autoclaves as easily as in those that are unlined. Baffles as well as other accessories are quickly and demountably installed in any desired set position inside the autoclaves spaced from the inner vitreous lining. Since the accessories are interchangeable, the same autoclave can be used for many different kinds of reactions.

Our invention distributes any stress on the baffle over both the lower and upper parts of the autoclaves. Another advantage is that we can make baffles of the shape and set them in the position and at the angle which is most effective in overcoming stratification and swirling of the mixture. We also provide an arrangement by which baffles furnish necessary support for other accessories such as cooling coils.

Other advantages of our invention are set forth in the accompanying drawings and the detailed description.

In the four sheets of drawings, various installations and types of baffles are illustrated.

Referring to the drawings:

Fig. 1 is a top plan view showing four baffles of the preferred type carried by a continuous ring.

Fig. 2 is a perspective view through the line 2—2 of one of these baffles.

Fig. 3 is a detailed bottom plan view of this baffle.

Fig. 4 is a detailed part view of an alternative form of baffle welded to a perforated plate.

Fig. 5 is a top plan view of another alternative form of baffle.

Fig. 6 is a part sectional view through 6—6 of Fig. 5 showing this type of baffle in elevation.

Fig. 7 is a detailed sectional view of the flanges on an autoclave showing the manner of clamping.

Fig. 8 is a longitudinal part sectional view of an autoclave showing in elevation the alternative form of baffle installed therein.

Figs. 9 and 10 are detailed views in elevation of a part of a coil with two other forms of baffles supporting the same.

Fig. 11 is a similar detailed view of one of the baffle blades shown in Fig. 9.

Fig. 12 is a longitudinal part sectional view of an autoclave showing in elevation another type of baffle blades with coil installed therein.

In our invention, we mount baffles and other accessories onto a ring or perforated plate a section at least of which is of similar shape and contour to the outward flanges on the rims of the kettle and cover of the autoclave. All then that is necessary to install the accessory is to fit the ring or plate carrying it between the flanges with the customary gaskets and seal or clamp all three members together.

Figs. 1 to 4 illustrate the preferred form of our invention. In this the four baffles 1 are integral with the continuous ring 2. This ring is similar in shape and contour to the outward flange 12 on the rim of the kettle or lower member of the autoclave and to a similar flange 11 on the rim of the cover or the upper member thereof as shown in Figs 7, 8 and 12. The baffle consists of the integral arm 5 depending perpendicularly downwards from the ring and the inner periphery of the blades 4 cut in the edges thereof as shown in Figs. 2 and 3.

Four of these arms are equally spaced on the inner rim of the ring. These arms are twisted inwards at 20 adjacent their junction with the ring through an angle of approximately 45 degrees. Each adjacent arm is bent or twisted in an opposite direction so that the adjacent arms are perpendicular to each other. The inner edges of the arms from approximately one-third distance down has 7 slits, each extending parallel to the plane of the ring transversely half-way through the arm to form the eight integral blades 4. These blades are bent as shown at 3 in Fig. 3 at their bases towards the center of the ring approximately 45 degrees so that all the blades point toward a common center. The blades of each adjacent arm are also twisted at their bases at 3 through 45 degrees each in an opposite direction.

Our invention is not limited to any one type of baffle or angle at which they are set. The variations that may be made both in the baffle and in the member to which it is attached without departing from the scope of our invention is an important feature. We are thus enabled to choose the best from which acts most efficiently in facilitating and obtaining the desired result. By choosing the especial type of baffle for a certain mixture or reaction we prevent stratificattion and swirling.

In Fig. 4 the ring is in the form of a perforated round plate 23. The baffle 1 is welded radially to the plate in such position that the outer portion of the plate projects at 21 to form an overhang, which is fitted between the flanges of the autoclave.

Figs. 5, 6 and 8 illustrate an alternative form of baffle. The four arms 5 extend perpendicularly downward from the ring 2 to which they are welded or cast. They are set diagonally at an angle of approximately 45 degrees the plane of each arm being perpendicular to the plane of the adjacent arm. The inner edge of the arm is flush with the inner circumference of the ring. The outer edge projects approximately a third of the width of the ring beyond the arm to provide sufficient overhang to fit between the outwardly extending flanges on the rims of the kettle and of the cover of the autoclave as shown in Fig. 8.

The upper blade of this type of baffle is a ring with the sides inclined at 45 degrees outwards and upwards to form an inverted frustrum of a cone 7. This blade is continuous passing through an inclined slot midway each vertical arm. These arms are Z shaped being flanged along both longitudinal edges at 6. The lower blade of the baffle is similar in shape to form an upright frustrum 8 of a cone. It is carried by the 20 end of the arm, the edges of which incline upward and inward at an angle of 45 degrees.

Fig. 7 illustrates the manner of clamping the member carrying the baffles between the flanges on the rims of the two members of the autoclave. Grommets 10 are placed between the carrying member 2 and the outwardly extending flanges 11 and 12 on the rims of the cover and the kettle of the autoclave. The clamp 13 fastening together these three members is of any ordinary type.

Experience proves that in some chemical reactions the water jacket 14 in Fig. 8 is not capable of maintaining the mixture in a large autoclave at the temperature desired. Heretofore it has been impossible to install coils in autoclaves to insure proper temperature therein since the coils could not be properly supported. We provide such means in another alternative form of baffle as shown in Figs. 9 to 12. In this form the blades 4 are spaced sufficiently to enable a spiral 15 of the coil 16 to rest on each blade. Each spiral is thus housed between adjacent blades of the baffle resting also against the inner edge of the vertical arm from which the blades project inwardly. The number of blades correspond to the number of spirals in the coil. In this manner adequate support is furnished the coil without bringing undue stress on any one blade of the baffle. To further restrict vibration of the coil, the spirals are bound or clamped together as shown at 17 in Fig. 9.

Three shapes of blades are shown. The blades integral the arms in Fig. 12 project in the same plane as the arms with the upper and lower edges of the blades cut perpendicularly to the inner edges of the arms. These blades have a straight edge, while those shown in Figs. 9 and 11 are notched or grooved on the upper edge adjacent the arm to fit snugly the spiral resting therein. The lower edge of the blade has a projecting ridge adjacent the arm. In Fig. 10 the blades extend upwards at an angle of 20 degrees to more effectively house the spirals 15 of the coil 16.

Our method of installing accessories such as baffle plates is not limited to autoclaves. It is also adapted for use in boilers and other vessels. Moreover, our method can be applied to any aperture in the shell of a vessel by forming an outward flange around the rim of the aperture and then fitting a plate or ring carrying the accessory onto the flange and fastening a cover over the aperture clamping together the three parts.

Figs. 8 and 12 show accessories installed in an autoclave. In these figures, the agitator or rotor 9 passes as usual through the cover 22 of the usual type of autoclave. The baffles and coil are installed outside the arms 18 of the agitator and are spaced clear of the inner surface of the kettle.

In installing the baffles, after placing a grommet as usual on the flange of the lower member, the ring or plate carrying the baffles is lowered and placed on the grommet, care being taken to see that the outer edges register and to avoid contact with the inner shell of the kettle. Another grommet is placed on the ring and the cover with the agitator is then lowered in place with its flange resting squarely on the ring or plate. All three members are then clamped together as shown in Fig. 7.

In installing the coil and baffles, the spirals of the coil are first fitted between the respective blades of the baffle. These are sprung fitted or threaded into place between the blades and the clamp 17 in Fig. 9 is placed on the spirals. Then the plate or ring carrying the baffles and coil is lowered and fitted between the flanges of the autoclave as already explained.

By our invention we firmly support the accessories on the flanged rims of the autoclave so as to prevent vibration and to distribute the strain over the entire autoclave. We thus enable the enameled inner lining of the autoclave as well as the baffles and the coils to withstand any stress set up in the agitator, however rapid its movement and dense the mixture. By enabling the coil to be installed in the autoclave, we provide effective means for regulating the temperature in reactions.

We claim as our invention:

1. An all purpose autoclave for general use in chemical laboratories both with and without accessories with flanges extending outwardly around the rim of its lower and upper members, a continuous ring shaped and adapted to fit between said flanges, an accessory depending rigidly and freely from the inner portion of said ring in such angular relation to it as to hang freely in desired set position in the autoclave, spaced from the inner shell thereof and means of detachably clamping said ring between said flanges, whereby the accessories are rendered readily interchangeable as the rings carrying accessories are easily demountable and interchangeable.

2. A continuous metal ring shaped to fit between the rims of adjacent sections of an autoclave having integral therewith a plurality of downwardly projecting baffle plates depending freely from its inner periphery and so disposed thereon as to be in desired position in the interior of the autoclave spaced from the shell and in set angular relation thereto when the ring is detachably fitted between the rims of the autoclave.

3. A baffle for use in autoclaves consisting of a vertically disposed arm having integral one of its longitudinal edges a plurality of blades carried by said edge each blade at its base being both bent to deflect that portion of the fluid stream impinging thereon horizontally and twisted to deflect that portion of the fluid stream impinging thereon vertically whereby swirling and stratification of the rotary stream is prevented.

4. A ring shaped and adapted to fit between flanges on the rims of the kettle and cover of an autoclave, a plurality of downwardly projecting arms carried by said ring in fixed angular relation to adjacent arms and parallel to alternate arms, and a plurality of blades carried on the inner edge of each arm and lying out of the plane of the arm.

5. An all purpose enameled autoclave with the entire vitreous inner lining of its kettle smooth and unbroken having a ring demountably fitted between flanges on the rims of the kettle and cover, an accessory freely depending therefrom so as to be rigidly installed in predetermined desired set position therein, spaced from the inner lining, whereby any desired accessory can be demountably installed without impairing the integrity and strength of said lining without limiting the usefulness of said autoclave.

6. An autoclave, having a rotor installed therein, a plurality of baffles demountably installed in desired set position therein and a ring rigidly carrying the baffles detachably clamped between the peripheries of the kettle and cover of the autoclave whereby the ring and baffles can be readily removed from the autoclave.

7. An autoclave having a coil installed therein, a ring demountably held between the kettle and cover, a baffle plate carried on said ring, a plurality of blades spaced apart and carried on the inner periphery thereof each blade fitting between and supporting a spiral of the coil.

8. An all purpose autoclave having outwardly flanged rims on its kettle and cover, a ring demountably secured and sealed between the two flanged rims and a plurality of baffle plates depending rigidly and freely, from the inner periphery of the ring in fixed angular spaced relation to each other and to the shell of the kettle, whereby said ring and baffle plates are readily removable from the autoclave and all contact with the inner lining is avoided.

9. In an all purpose enameled autoclave, a plurality of baffle plates distributed in equal spaced relation around its interior each in angular relation to the shell of the autoclave and adjacent plates and a plurality of rings each forming a frustrum of a cone carried by the plates in opposed spaced angular relation to the adjacent rings.

ISAAC N. BEALL.
JOHN B. WISE.
EDWIN B. WISE.